United States Patent [19]

Vandenberg

[11] Patent Number: 4,786,113
[45] Date of Patent: Nov. 22, 1988

[54] FARM EQUIPMENT STABILIZER DISC

[76] Inventor: Douglas N. Vandenberg, 4041 100 Hwy. U, DePere, Wis. 54115

[21] Appl. No.: 922,501

[22] Filed: Oct. 23, 1986

[51] Int. Cl.⁴ ............................................. B60B 15/00
[52] U.S. Cl. .................................. 301/41 R; 280/757; 172/190; 172/536
[58] Field of Search ................ 301/38 R, 38 S, 41 R; 188/5; 280/757, 767; 172/190, 536

[56] References Cited

U.S. PATENT DOCUMENTS

| 1,028,051 | 5/1912 | McMillen | 301/40 S |
| 1,830,879 | 11/1931 | Michelin | 301/38 R |
| 2,179,170 | 11/1939 | Bahensky | 301/38 R |
| 2,188,221 | 1/1940 | Gilkerson | 301/38 R |
| 2,234,838 | 3/1941 | Briskman | 301/38 R |
| 2,823,956 | 2/1958 | Gray | 301/38 R |

FOREIGN PATENT DOCUMENTS

| 275594 | 6/1914 | Fed. Rep. of Germany | 301/38 R |
| 282968 | 3/1915 | Fed. Rep. of Germany | 172/536 |
| 419986 | 2/1948 | Italy | 301/38 R |
| 10631 | 8/1911 | United Kingdom | 172/190 |

Primary Examiner—Robert B. Reeves
Assistant Examiner—Russell D. Stormer
Attorney, Agent, or Firm—Francis J. Bouda

[57] ABSTRACT

A stabilizing disc for farm equipment used in muddy fields or loose soil which has a circular plate-like body with a centering ring of one diameter fastened to, and extending away from, one side of the disc and a second centering ring of different diameter secured to, and extending away from, the other face of the disc. Both centered rings are concentric with the outer edge of the disc, and a plurality of fastening members are arranged within the centering rings for securing the disc to the wheels of crop-harvesting equipment.

1 Claim, 1 Drawing Sheet

U.S. Patent      Nov. 22, 1988      4,786,113
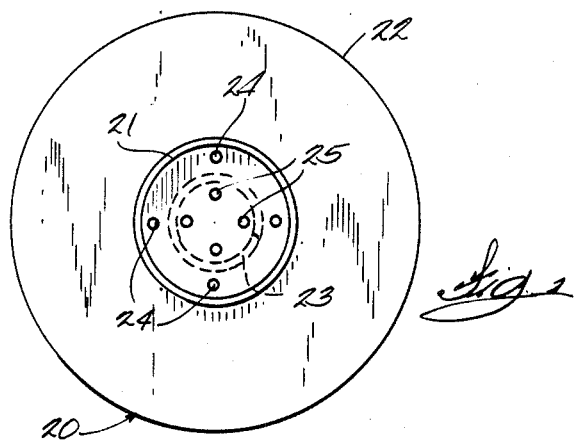
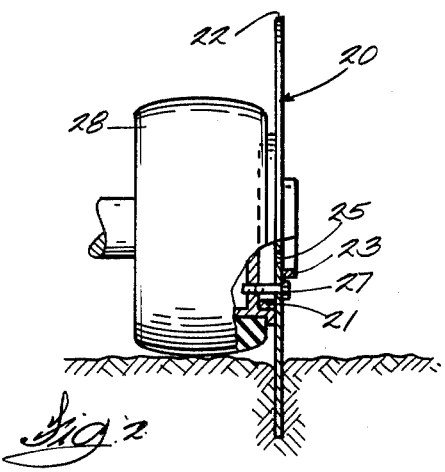
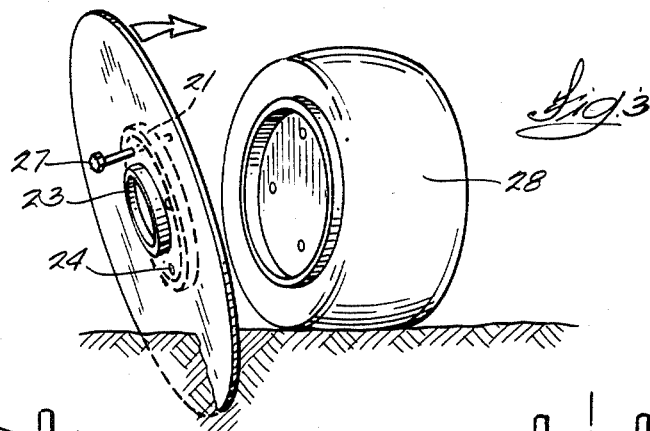
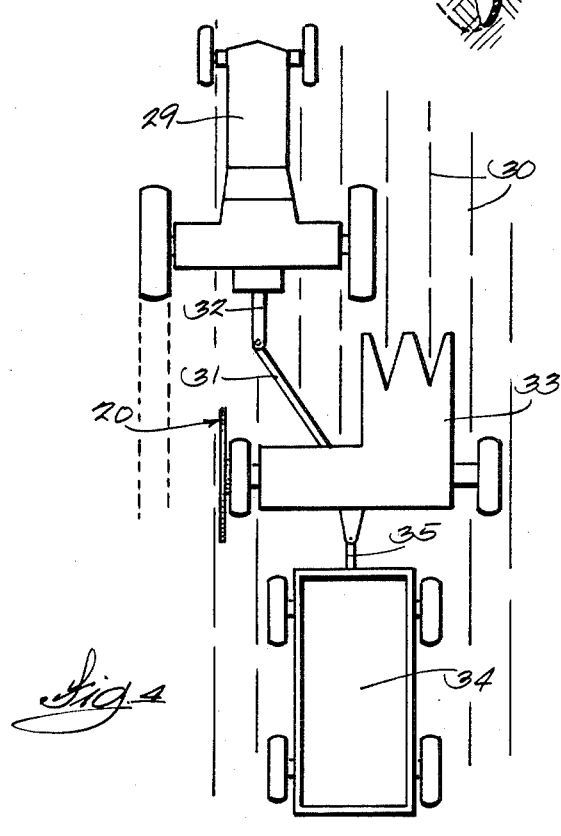
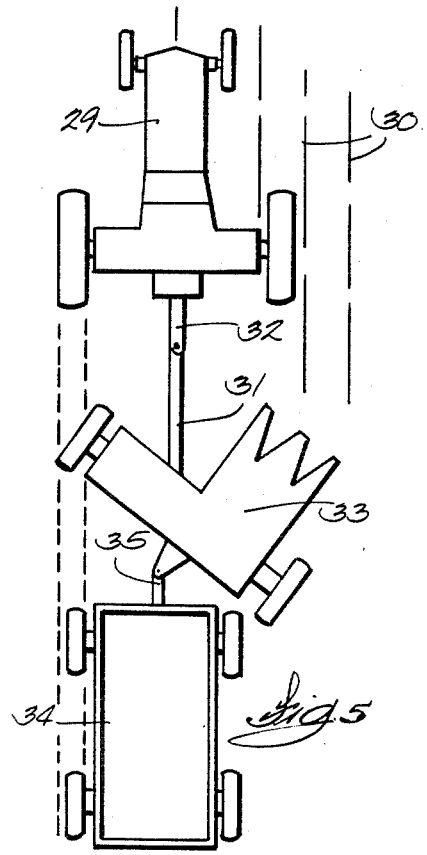

FARM EQUIPMENT STABILIZER DISC

BACKGROUND OF THE INVENTION

The present invention relates to an attachment for farm equipment or farm machinery, particularly to harvesting equipment towed by a tractor or similar prime move power-source. The invention comprises a disc or plate-like member constructed and arranged for attachment to the wheels of crop-harvesting farm equipment, such as a corn-picker or chopper, or the like.

It is intended primarily for use on equipment operating on very loose or wet soil, wherein the traction between the surface of the earth and the wheels of the equipment is less than desirable and produces undesirable operation of the harvesting equipment.

More specifically, it is intended for attachment to the wheels of harvesting equipment, so as to permit such wheels and machinery to "track" properly behind the prime mover or tractor, or power source.

Devices of a similar nature have been suggested in the past and are referred particularly to in Gilkerson U.S. Pat. No. 2,188,221 dated Jan. 23, 1940, as well as Bahensky U.S. Pat. No. 2,179,170 patented Nov. 7, 1939.

Gilkerson's device was designed especially for use on the front wheel of tractors or prime movers. However, in those early years very few tractors had wheel brakes to aid in turning in loose ground, particularly tractors with narrow front wheels operating on hilly fields. They were hard to turn without sliding laterally, and thus the Gilkerson device was primarily a steering-aid for the prime mover, not a tracking-aid for a piece of equipment being towed behind the tractor.

Bahensky's device was designed for rear tractor wheels, especially in irrigated corn fields which had especially high ridges. It was necessary for the tractor to follow the ridges because the corn harvesting equipment towed behind the tractor was essentially a corn binder which had no adjustable pull, as do the corn choppers or the harvesters of today's equipment. Therefore, Bahensky produced a device to keep the tractor on the ridges of the cut rows, and by so doing it would keep the binder on the row that was being cut, not the uncut rows which were at the side of the tractor. In those days the tractors were light in weight, and it was hard to keep them on the ridges, and thus Bahensky's patent was designed to assist in this operation of the tractor, not of the equipment being towed behind.

At the time of the Gilkerson and Bahensky inventions, off-set corn choppers or corn pickers had not yet been invented, and thus there was no need for the present invention.

Additionally, the devices used on farms at present, not only towed in an off-set manner behind the tractor, but behind the picker or chopper a trailing wagon is pulled, into which the harvested corn is tossed. As this wagon gets more fully loaded, it becomes heavier, and the drawing pull on the tow bar behind the chopper increases the strain on the off-set tow bar, creating even a stronger force to drag the wheels of the harvesting machine into the ruts created by the tractor itself.

SUMMARY OF THE INVENTION

Therefore, a stabilizing disc of the present invention is a simple and convenient attachment for a harvesting device used in muddy fields or fields which have very loose soil. The disc is arranged with a series of centering rings which permit the attachment to the wheels of the harvesting machine while the machine is resting in the muddy field, and also permits easy removal therefrom when the harvesting machine is pulled out of the field onto hard ground or pavement or roadway.

The relatively simple and uncomplicated mechanism nevertheless increases the efficiency of the harvesting equipment by enabling it to operate properly in alignment with the rows of corn to be harvested and, moreover, the picker will stay straight and will pull much easier so that it will not only do a better job of harvesting but also economize on power, fuel and energy.

The principal object of the present invention is to provide an inexpensive and simple attachment for agricultural harvesting equipment to enable it to operate effectively in muddy fields of fields having loose soil.

An additional object of the present invention is to provide a harvester for corn or other similar agricultural crops which permits the equipment to operate in an offset manner to one side of the tractor while being operated in muddy fields or fields having loose soil.

With the above and other objects in view, more information and a better understanding of the present invention may be achieved by reference to the following detailed description.

DETAILED DESCRIPTION

For the purpose of illustrating the invention, there is shown in the accompanying drawings a form thereof which is at present preferred, although it is to be understood that the several instrumentalities of which the invention consists can be variously arranged and organized and that the invention is not limited to the precise arrangements and organizations of the instrumentalities as herein shown and described.

In the drawings, wherein like reference characters indicate like parts:

FIG. 1 is a front elevational view of the stabilizing disc of the present invention.

FIG. 2 is a front end view of the disc of the present invention showing its method of attachment to a piece of farm equipment.

FIG. 3 is a front perspective view of the disc showing how it can be applied to a piece of farm equipment in extremely muddy fields.

FIG. 4 is a diagrammatical sketch showing how the disc of the present invention stabilizes a corn picker to keep it and the trailing wagon following properly behind a tractor during the harvesting procedure.

FIG. 5 is a schematic sketch similar to FIG. 4 illustrating what happens when the device of the present invention is not used while harvesting in muddy fields or fields of very loose soil.

In FIG. 1, I have shown disc 20 which can be made of steel plate or similar material, and which has secured on one side thereof a ring 21 disposed concentrically with the outside edge 22 of the disc 20. On the opposite side of the disc 20, a ring 23 having a diameter different from the ring 21 is disposed in concentric arrangement with the edge 22.

A plurality of holes 24 are disposed in the disc in a position to be in alignment with bolt-receiving holes in the wheels of the farm equipment.

If desired, a second set of holes 25 may be placed within the ring 23 so that the disc may be attached to implements having wheels of smaller diameter.

The rings 21 and 23 are of a diameter selected so that they will fit correctly within the wheel 26 of a piece of farm equipment, as can be seen more clearly in FIG. 2 and 3.

A plurality of bolts 27 pass through the appropriate holes 24 or 25 in the disc and through corresponding holes in the wheel 26 of the equipment so that the disc 20 can be bolted securely and concentrically to the wheel 26.

The diameter of the edge 22 of the disc 20 is larger than the diameter of the outer tire 28 on the wheel 26 so that the outer edge 22 will penetrate farther into the loose or muddy soil after the disc has been attached to the wheel.

This can be easily accomplished in a muddy field where the loose or muddy soil can be removed from the outer side of the wheel to create a depression or cavity into which the disc can be lowered, so as to bring the appropriate ring (21 or 23) up against the wheel 26 and permit its adjustment and alignment so that the holes (24 or 25) are opposite the opposing holes in the wheel and therefore permitting the bolts 27 to pass therethrough and to fasten the disc 20 to the wheel.

The simplicity of this device is its principal attraction, because it can be made inexpensively, and can be attached to whichever farm equipment the owner desires. Because of the standardization of wheels and tires for farm equipment, the diameter of the rings 21 and 23 can be selected so as to fit a variety of harvesting machines.

The particular advantages of this simple invention is to permit a very expensive combination of tractor, harvester and wagon to operate effectively in field conditions which would otherwise prevent harvesting and thus cause extensive economic loss to the farmer.

In FIG. 5, I have illustrated the problem which occurs when the disc of the present invention is not available. The tractor 29 travels in a field parallel to the rows of the crops 30 which are to be harvested. A tow bar 31 is attached to the tractor at its mid-point in the rear, as at 32, and to the harvesting equipment at a position indicated by numeral 33.

Under normal conditions, this two bar is an off-set arrangement which permits the harvesting equipment to follow in disc-alignment with the tractor, as shown in FIG. 4, so that the operative ends of the harvesting equipment are in alignment with rows of the crop to be harvested.

As can be seen in FIG. 5, in muddy fields or fields having very loose soil, there is not sufficient traction between the wheels and the surface to keep the harvesting equipment in disalignment, and the tendency of the tow bar is to swing directly behind the tractor so that the wheels of the harvester then fall into the ruts created by the larger wheels of the tractor. This situation is intensified because the heavy wagon 34 following behind and towed by the harvester through the tow bar 35 also draws the wheels of the wagon and the harvester into the ruts created by the tractor.

When the harvester is in alignment behind the tractor, the harvesting cutters and chopper equipment are not in alignment with the rows of the crop to be harvested; and, therefore, the stalks of the corn or other crops are only partially cut off because the harvester is sliding laterally along the rows.

Not only is the harvester a fairly heavy piece of equipment, but when the wagon behind it is loaded from 6 to 10 tons of silage, the forces acting upon the harvesting equipment to keep it directly behind the tractor are intensified, and the correct and efficient operation of the harvester is greatly minimized.

However, as can be seen in FIG. 4, this situation can be overcome by utilizing the stabilizing disc of the present invention on the harvester which keeps the chopper or picker and the wagon out of the ruts created by the tractor, and in straight alignment with the crops to be harvested. This eliminates the lateral sliding of equipment and the inefficient cutting of the corn stalks, and permits the farmer to operate under weather conditions which otherwise would prevent the crop from being harvested.

Although I have described my invention for use on a single "outboard" wheel of the harvesting equipment, quite obviously under very adverse and severe conditions a second disc could be utilized on the inboard end of the equipment as well.

Although I intend this inexpensive arrangement to be manually attached and detached in the field (after the machine has been towed over-the-road from the barn), it is to be understood that the disc may be permanently mounted on the wheels. In such instance, auxiliary wheels on the machine are arranged to elevate the regular wheels (with the disc) above the ground level in a manner similar to standard harvestors or cultivators. This arrangement is more expensive, but if the equipment has such lifters already as a part of the machine, the stabilizing disc of the present invention can remain in place at all times.

It is to be understood that the present invention may be embodied in other specific forms without departing from the spirit or special attributes hereof, and it is therefore desired that the present embodiments be considered in all respects as illustrative, and therefore not restrictive, reference being made to the appended claims rather than to the foregoing description to indicate the scope of the invention.

Having thus described my invention, what I claim as new and desire to protect by Letters Patent are the following:

1. A stabilizing disk for attachment to wheels of a farm crop harvester, comprising a flat, rigid disc having on one side thereof a first ring concentric with the outer edge of the disc and extending laterally away therefrom to provide means for centering the disc with respect to a wheel of a first size, said disc further having a second ring concentric with both the outer edge of the disc and the first ring on the opposite side of the disc and extending laterally way therefrom to provide means for centering the disc with respect to a wheel of a second size, said second ring having a smaller diameter than that of said first ring, a first plurality of holes extending through the disc, disposed between the first and second rings for receiving means for fastening the disc to said first size wheel, and a second plurality of holes extending through the disc within said second ring for alteratively receiving means for fastening the disc to said second size wheel, whereby the disc can be attached to either a wheel of the first size or a wheel of the second size, said disc having a diameter greater than that of either of said wheels.

* * * * *